United States Patent [19]

Ohtsuka

[11] Patent Number: 5,106,191
[45] Date of Patent: Apr. 21, 1992

[54] TWO-FREQUENCY DISTANCE AND DISPLACEMENT MEASURING INTERFEROMETER

[75] Inventor: Masaru Ohtsuka, Kanagawa, Japan

[73] Assignee: Canon Kabushiki Kaisha, Tokyo, Japan

[21] Appl. No.: 533,518

[22] Filed: Jun. 5, 1990

[30] Foreign Application Priority Data

Jun. 7, 1989 [JP] Japan ................... 1-143083

[51] Int. Cl.⁵ ..................................... G01B 9/02
[52] U.S. Cl. ........................... 356/349; 356/358; 356/363
[58] Field of Search ............... 356/349, 358, 363; 372/28, 29, 32

[56] References Cited

U.S. PATENT DOCUMENTS

| | | | |
|---|---|---|---|
| 4,821,273 | 4/1989 | Hori | 272/32 |
| 4,886,363 | 12/1989 | Jungquist | 356/358 |
| 4,906,095 | 3/1990 | Johnston | 356/349 |
| 4,912,530 | 3/1990 | Bessho | 356/349 |

FOREIGN PATENT DOCUMENTS 62-135703 6/1987 Japan .
62-204103 9/1987 Japan .

OTHER PUBLICATIONS

"Interferonmeter for Measuring Displacement and Distance" by Toshihiro Kubota et al., Optical Letters/vol. 12, No. 5/May, 1987, pp. 310-312.

Primary Examiner—Samuel A. Turner
Assistant Examiner—Richard Kurtz
Attorney, Agent, or Firm—Fitzpatrick, Cella, Harper & Scinto

[57] ABSTRACT

Semiconductor-laser length measuring apparatus includes first and second semiconductor lasers that oscillate in different wavelength regions. A frequency modulator modulates the oscillation frequency of the first semiconductor laser and a light beam splitter divides the first and second light beams output from the first and second semiconductor lasers into third, fourth, fifth and sixth light beams which are projected onto and are reflected from an object to be measured. The phase difference between the third and fourth light beams and the phase difference between the fifth and sixth light beams are detected and the difference in optical paths between the divided light beams is obtained according to the detection result. Incremental measurements are performed by obtaining the optical path difference between the divided laser light beams, for example, a difference between a beat signal produced from interference between the third and fourth laser light beams or from interference between the fifth and sixth laser light beams and an oscillation frequency driving the first and second modulators. The apparatus may be arranged to switch to incremental measurement after a measurement of the absolute optical path difference.

19 Claims, 8 Drawing Sheets

FIG. I
PRIOR ART

TWO-FREQUENCY DISTANCE AND DISPLACEMENT MEASURING INTERFEROMETER

BACKGROUND OF THE INVENTION

1. Field of the Invention

This invention relates to a length measuring apparatus for detecting a distance up to an object to be measured and a displacement of the object, and more particularly, to a length measuring apparatus for accurately measuring a displacement and a position of the object utilizing coherent light, such as laser light or the like. The apparatus is suitably used, for example, for the control of a stage of an exposing apparatus for semiconductor devices.

2. Description of the Prior Art

Heretofore, as a length measuring apparatus for the control of a stage of an exposing apparatus for semiconductor devices, a so-called two-wavelength-laser interferometer has been known which measures a distance of movement by utilizing a Doppler shift in optical frequency caused by the movement of a mirror mounted on the stage. This approach is termed a first conventional example.

FIG. 1 shows a diagram of the configuration of such an apparatus for explaining the principle of measurement in the first conventional example.

In FIG. 1, there are shown a two-frequency Zeeman laser oscillator 1, serving as a light source, a beam splitter 2, an interferometer unit 3 consisting of a polarizing beam splitter and a corner cube, a $\lambda/4$ plate 4, a plane reflecting mirror 5, polarizers 6a and 6b, photodetectors 7a and 7b, pulse converters 8a and 8b for converting sinusoidal signals into pulse trains, an up/down counter 9 for performing addition/subtraction of pulses, and a stage 10.

In the above-described configuration, two light beams P and Q emitted from the two-frequency Zeeman laser oscillator 1 are electromagnetic waves having frequencies of $f_1$ and $f_2$, respectively, and are linearly polarized light beams orthogonal to each other. Each of the light beams P and Q is divided into two beams by the beam splitter 2. Deflected light beams interfere with each other by the function of the polarizer 6a, and the resultant light beam is detected as a beat signal having a frequency $f_1-f_2$ by the photodetector 7a. This signal is made a reference signal.

The straight-going beams enter the interferometer unit 3, and are divided into light beams P and Q by the function of the polarizing beam splitter. The light beam Q exits after passing through only the interior of the interferometer unit 3, and the light beam P exits after being reflected twice by the plane reflecting mirror 5 mounted on the stage 10. The light beams P and Q interfere with each other by the function of the polarizer 6b, and the resultant light beam is also detected as a beat signal having a frequency $f_1-f_2$ by the photodetector 7b. The beat signals detected by the photodetectors 7a and 7b are converted into pulse trains by the pulse converters 8a and 8b, respectively, and the difference between the numbers of the pulses is counted by the up/down counter 9.

In this state, if the stage 10 moves at a speed v in the direction of the optical axis, the light beam P reflected by the mirror 5 on the stage 10 is subjected to a Doppler shift per one reflection of $$\Delta f = 2v/C \cdot f_1 \qquad (1),$$

where C is the velocity of light. Since the light beam P is reflected twice in the configuration in FIG. 1, the light beam P subjected to a Doppler shift of $2\Delta f$ is incident upon the photodetector 7b. Hence, the frequency of the signal detected by the photodetector 7b changes to $f_1-f_2\pm2\Delta f$. To the contrary, the signal detected by the photodetector 7a remains to be $f_1-f_2$. As a result, the output from the up/down counter 9 becomes $\pm2\Delta f$. The amount of movement of the stage 10 is obtained by multiplying this output value by the wavelength of the light beam P. Thus, in the conventional apparatus, the amount of displacement of the stage is incrementally obtained.

On the other hand, as disclosed in Japanese Patent Public Disclosure (Kokai) Nos. 62-135703 (1987) and 62-204103 (1987), a method has also been devised in which absolute position and displacement are measured using light sources having different wavelengths. This method is termed a second conventional example. In this method, a phase difference $\phi_1$ in interference fringes obtained by a wavelength $\lambda_1$ has the following relationship:

$$l = (2\pi N + \phi_1)\lambda_1/2\pi \qquad (2),$$

where l is the optical path difference of an interferometer, and N is a natural number. Hence, a range that an unknown natural number N may have is gradually restricted by measuring phase differences $\phi_2$, $\phi_3$---for various wavelengths $\lambda_2$, $\lambda_3$---, and an absolute position l is obtained by finally uniquely determining the natural number N.

However, the first conventional example has a disadvantage in that, since the distance of movement is measured by obtaining the integral of the difference between the reference pulses and measurement, it becomes impossible to perform measurement if the laser light is shut off even for a moment. The example also has a disadvantage in that, since only the amount of displacement from a point which has been reset can be measured, it is necessary to separately provide an origin sensor for, for example, the control of a stage, and hence the system of the stage becomes complicated.

On the other hand, although an absolute measurement can be performed in the second conventional example, and hence the disadvantages in the first conventional example are eliminated, the second conventional example has a problem in that it is difficult to perform real-time monitoring of the position of a stage moving at high speed, since a complicated method of measurement is needed.

SUMMARY OF THE INVENTION

The present invention has been made in consideration of the problems in the prior art as described above.

It is an object of the present invention to provide a length measuring apparatus which has a simple configuration, and does not need an origin sensor or the like, and in which measurement can immediately be resumed even if a laser light beam is cut off due to an unexpected accident or the like, and real-time monitoring of the position of an object moving at high speed can easily be performed.

It is another object of the present invention to provide a length measuring apparatus which performs absolute measurement and incremental measurement as described above, and in which an error due to variable factors (for example, partial difference in displacement due to a tilt of a mirror on a stage) does not significantly occur between measured values of the two types of measurement.

These and other objects and features of the present invention will become more apparent from the following detailed description of the preferred embodiments of the present invention.

DETAILED DESCRIPTION OF THE PREFERRED EMBODIMENTS

Summary of the Embodiments

Figure 1:
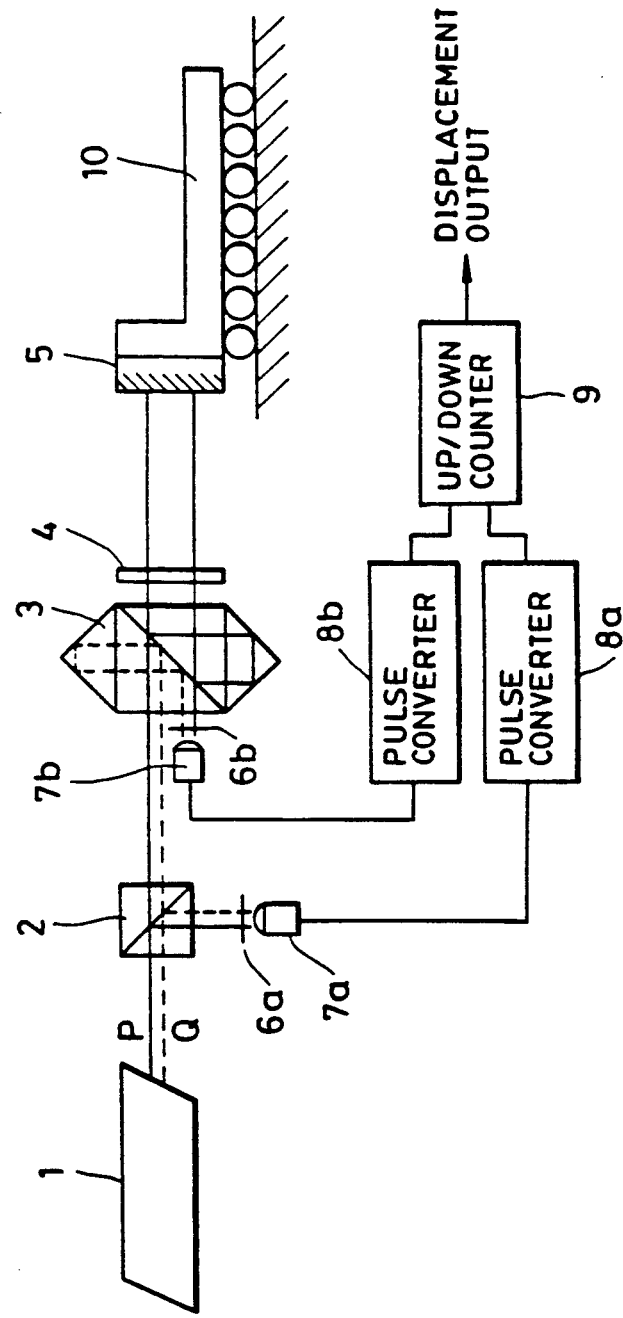
FIG. 1 is a diagram showing the configuration of a semiconductor-laser length measuring apparatus according to a conventional example.

In order to achieve the above-described objects, a semiconductor-laser length measuring apparatus according to an embodiment, to be described later, includes first and second semiconductor lasers which oscillate in wavelength regions different from each other, frequency modulation means for modulating an oscillation frequency of the first semiconductor laser, light beam dividing means for dividing first and second laser light beams output from the first and second semiconductor lasers, respectively, into third and fourth, and fifth and sixth light beams, respectively, phase difference detection means for projecting the third and fifth laser light beams onto and making them reflect from an object to be measured, and for detecting a phase difference between the reflected light beam of the third laser light beam and the fourth laser light beam, and a phase difference between the reflected light beam of the fifth laser light beam and the sixth laser light beam, and means for obtaining an optical path difference between the divided laser beams according to the result of the detection.

Usually, the operation of the oscillation frequency modulation means is switched on and off by selection means for selecting whether the first laser light beam is modulated or maintained at a constant frequency.

At least one of the first and second semiconductor lasers includes oscillation wavelength stabilizing means for maintaining an oscillation wavelength constant.

The phase difference detection means includes, for example, a first AO (acoustooptic) modulator for shifting frequencies of the third and fifth laser light beams, and a second AO modulator for shifting frequencies of the fourth and sixth laser light beams, and detects phase differences by heterodyne detection using these modulators.

It is preferred that the oscillation frequency modulation means has a variable frequency modulation width.

When incremental measurement is performed, there is provided means for incrementally obtaining an optical path difference between divided laser light beams, for example, according to a beat signal produced from interference between the third laser light beam and the reflected light beam of the fourth laser light beam, or from interference between the fifth laser light beam and the reflected light beam of the sixth laser light beam, and a difference between an oscillation frequency for driving the first AO modulator and that for driving the second AO modulator. The apparatus switches to the incremental measurement after measuring an absolute optical path difference.

The phase difference detection means usually further includes a wavelength selection mirror for separating the third laser light beam and the reflected light beam of the fourth laser light beam, and the fifth laser light beam and the reflected light beam of the sixth laser light beam.

In another aspect, only one semiconductor laser is used. In this case, an apparatus includes a semiconductor laser, frequency modulation means for modulating an injection current for the semiconductor laser within a range in which an oscillation wavelength continuously changes frequency changing means for modulating the injection current for the semiconductor laser within a range in which the oscillation wavelength discontinuously changes, fixing means for controlling the injection current for the semiconductor laser so as to maintain the oscillation wavelength constant, means for selecting by switching the frequency modulation means, frequency changing means or fixing means, light beam dividing means for dividing a laser light beam output from the semiconductor laser into two light beams, phase difference detection means for projecting one of the divided laser light beams onto and making it reflect from an object to be measured, and for detecting a phase difference between the reflected light beam and another divided laser light beam, and means for obtaining an optical path difference between the divided laser light beams according to the result of the detection.

The light beam dividing means divides, for example, the laser light beam into a P-polarized light beam and an S-polarized light beam. The phase difference detection means includes AO modulators for providing frequency shifts different from each other for the P-polarized light beam and S-polarized light beam. Making the difference between these frequency shifts a reference signal, and making a beat signal produced by interference between the P-polarized light beam and the S-polarized light beam, one of which is a reflected light beam from the object to be measured, a measured signal, the light beam dividing means detects the phase difference between the reference signal and the measured signal.

There is also provided means for converting the reference signal and measured signal into pulse signals, and for counting the difference between the numbers of pulses of the respective signals. When the fixing means is selected by the selection means, incremental measurement of an optical path difference is performed by this means.

In the above-described configuration, a first and a second laser light beams are divided into third and fourth laser beams, and fifth and sixth laser light beams, respectively. After the third and fifth laser light beams have been reflected by the object to be measured, phase differences are detected between the third and fourth laser light beams, and the fifth and sixth laser light beams, respectively. When the oscillation frequency of the first laser light beam is modulated by the frequency modulation means, such as an oscillator or the like, the width of variations in the detected phase difference has a predetermined relationship with the optical path difference between the third and fourth laser light beams. Hence, the optical path difference between the third and fourth laser light beams is obtained utilizing the relationship according to the detected phase difference.

On the other hand, when the oscillation frequency of the first laser light beam is not modulated by the frequency modulation means, and hence the frequency is constant, each of the phase differences between the third and fourth, and the fifth and sixth laser light beams has a predetermined relationship with the corresponding optical path difference, which is equal to each other. Hence, a more accurate absolute optical path difference can be obtained utilizing the relationship from the respective phase differences.

As for an incremental displacement, after the absolute optical path has thus been obtained, the phase difference between the third and fourth, or the fifth and sixth laser light beams is counted making the oscillation frequency constant, and an optical path difference can accurately be obtained from a predetermined relationship existing between the counted value and the optical path difference.

In the other aspect, only one laser is used, but the frequency changing means is instead provided. An optical path difference is thereby obtained according to a principle identical to that in the case of performing frequency modulation by the frequency modulation means. In this case, however, the width of variations in frequency is large. Hence, more accurate measurement can be performed in proportion to the larger width.

Thus, by combining two-wavelength interferometry using two coherent light sources which oscillate light beams having different wavelengths with a method of measuring an absolute distance by modulating an oscillation frequency of one of two light sources, it becomes possible to perform absolute measurement of a long distance only using two wavelengths without changing an optical system. In the other aspect, by performing measurement by arbitrary switching among the frequency modulation means, frequency changing means and fixing means, it is possible to perform absolute measurement of a position by a single semiconductor-laser light source.

The preferred embodiments of the present invention will now be explained with reference to the drawings.

EMBODIMENT 1

Figure 2:
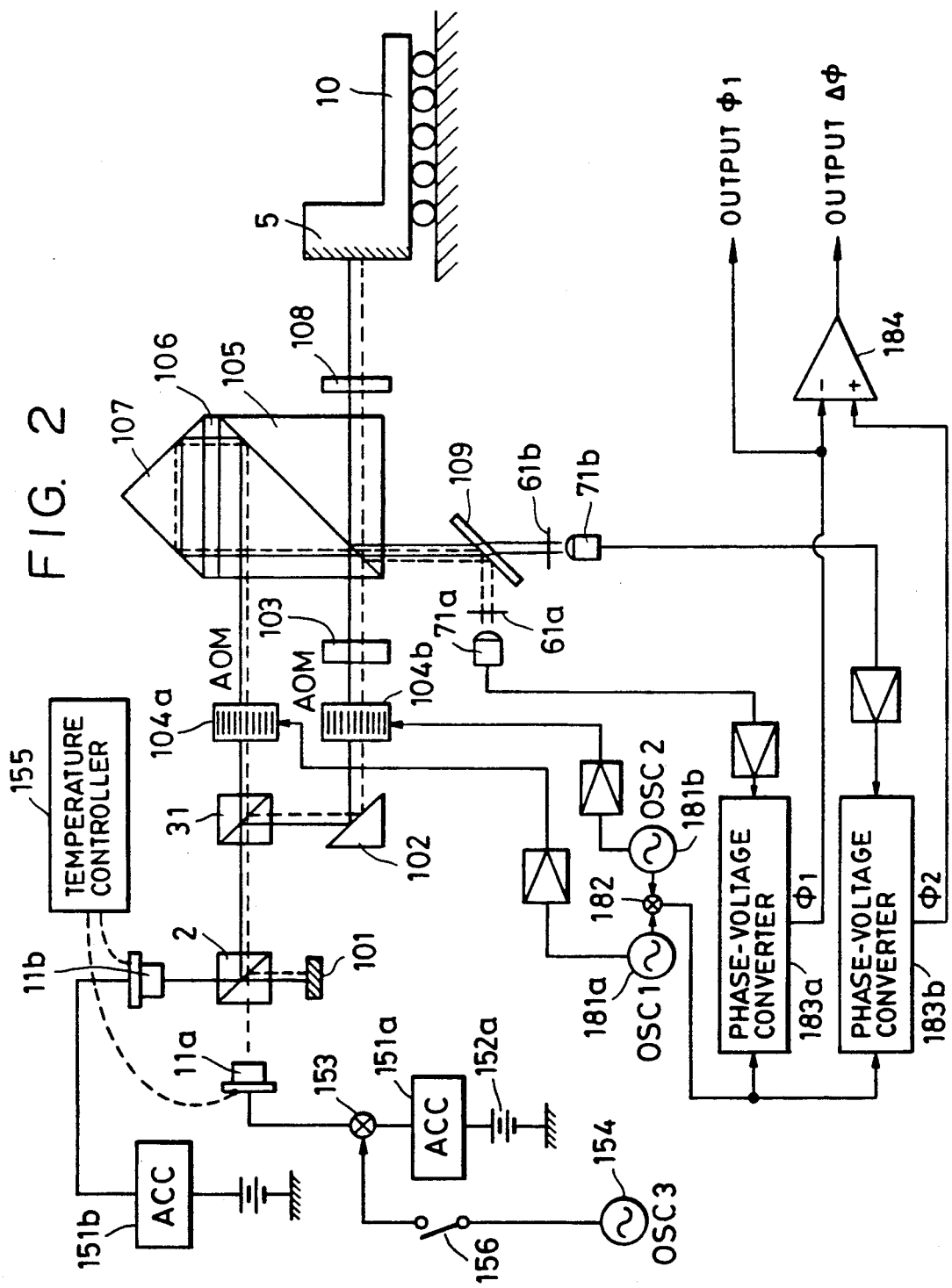
FIG. 2 is a diagram showing the configuration of an absolute position measuring unit of a semiconductor-laser length measuring apparatus according to a first embodiment of the present invention.

FIG. 2 is a diagram showing the configuration of an absolute position measuring unit according to a first embodiment of the present invention. In FIG. 2, a semiconductor laser 11a oscillates a coherent light beam having a wavelength $\lambda_1$ (frequency $f_1$). A semiconductor laser 11b oscillates a coherent light beam having a wavelength $\lambda_2$ (frequency $f_2$). There are shown a beam splitter 2, a light absorber 101, a beam splitter 31, a 45° mirror 102, and a $\lambda/2$ plate 103. An AO modulator 104a is driven with a frequency $F_1$. An AO modulator 104b is driven with a frequency $F_2$. There are also shown a polarizing beam splitter 105, a $\lambda/4$ plate 106, a corner cube 107, a $\lambda/4$ plate 108, a plane mirror 5 mounted on a stage, and a stage 10. A wavelength selection mirror 109 reflects light beams having wavelengths near $\lambda_1$, and transmits light beams having wavelengths near $\lambda_2$. There are also shown polarizers 61a and 61b, and photodetectors 71a and 71b. Current control circuits 151a and 151b keep currents injected into the semiconductor lasers 11a and 11b constant, respectively. Power supplies 152a and 152b supply the semiconductor lasers 11a and 11b with electric power, respectively. A mixer circuit 153 mixes AC current with DC current. An oscillator (with a frequency $f_m$) 154 performs AC modulation of the semiconductor laser 11a. A temperature controller 155 maintains the temperatures of the semiconductor lasers 11a and 11b constant. A switch 156 selects whether or not the semiconductor laser 11a is subjected to frequency modulation. Oscillators 181a and 181b drive the AO modulators 104a and 104b, respectively. A mixer 182 mixes signals having two different frequencies, and outputs a signal having a frequency equal to the difference between the two frequencies. Phase-voltage converters 183a and 183b compare output signals from the photodetectors 71a and 71b with a reference signal from the mixer 182, respectively, and convert the respective phase differences into voltages. A differential amplifier 184 calculates the difference between the two voltages.

In the above-described configuration, light beams emitted from the semiconductor lasers 11a and 11b are incident upon the beam splitter 2 in a linearly polarized state having an equal orientation, and exit separated in two directions orthogonal to each other. Among these light beams, the light beams going toward the light absorber 101 are absorbed and converted into thermal energy. On the other hand, the light beams going toward the right in FIG. 2, optical paths of which coincide with each other, are incident upon the beam splitter 31, and are further separated into light beams going toward the right and light beams going in a downward direction in FIG. 2. The light beams going to the right are subjected to frequency shifts by the AO modulator 104a to become light beams having frequencies $f_1+F_1$ and $f_2+F_1$, and are incident upon the polarizing beam splitter 105, pass the $\lambda/4$ plate 106, the corner cube 107 and again the $\lambda/4$ plate 106, and return to the polarizing beam splitter 105. At this time, since the polarization angle is rotated by 90°, the light beams then exit in a downward direction in FIG. 2. On the other hand, the light beams going in a downward direction from the beam splitter 31 are deflected by the 45° mirror 102, and are then subjected to frequency shifts by the AO modulator 104b to become light beams having frequencies $f_1+F_2$ and $f_2+F_2$. The polarization angles of the light beams are then rotated by 90° by the $\lambda/2$ plate 103. The light beams are then incident upon the polarizing beam splitter 105 in these states, pass the $\lambda/4$ plate 108, and are reflected by the plane mirror 5. The polarization angle of the reflected light beams are rotated by 90° after passing again the λ/4 plate 108. The light beams then return to and are reflected by the polarizing beam splitter 105, and exit in a downward direction in FIG. 2.

Among the four light beams having frequencies $f_1+F_1$, $f_2+F_1$, $f_1+F_2$ and $f_2+F_2$ exited from the polarizing beam splitter 105, the light beams having frequencies $f_1+F_1$ and $f_1+F_2$ are reflected by the function of the wavelength selection mirror 109, then interfere with each other by the function of the polarizer 61a, and a beat signal $F_1-F_2$ between the two light beams is detected by the photodetector 71a. The light beams having frequencies $f_2+F_1$ and $f_2+F_2$ are transmitted by the wavelength selection mirror 109, interfere with each other by the function of the polarizer 61b, and a beat signal having a frequency $F_1-F_2$ between the two light beams is detected by the photodetector 71b.

Phase differences between the beat signals having the frequency $F_1$-$F_2$ detected by the photodetector 71a and 71b and an output signal having a frequency $F_1-F_2$ obtained by mixing signals having frequencies $F_1$ and $F_2$ from the oscillators 181a and 181b for driving the AO modulators in the mixer 182 are detected by the phase-voltage converters 183a and 183b, respectively. Signals having phase differences $\phi_1$ and $\phi_2$ output from the phase-voltage converters 183a and 183b, respectively, are input to the differential amplifier 184, from which a signal having a phase difference $\Delta\phi = \phi_2 - \phi_1$ is output. At this time, one of the signals having the phase differences $\phi_1$ and $\phi_2$ input to the differential amplifier 184 is extracted as a separate output.

Oscillation frequencies of the semiconductor lasers 11a and 11b, serving as light sources, must be stabilized in order to maintain accuracy in measurement. Hence, temperature variations of the semiconductor lasers 11a and 11b are maintained at about 0.001° C. by the precise temperature controller 155. At the same time, injection currents are maintained constant by the current control circuits 151a and 151b for keeping the currents constant even if there exist variations in the power supplies 152a and 152b.

A current can be injected into either one of the semiconductor lasers 11a and 11b (for example, 11a) while being modulated by the function of the oscillator 154 having an oscillation frequency $F_M$ and the mixer 153. Since there exists a proportional relationship between the oscillation frequency of a semiconductor laser and injection current within a certain range (about 0.05 nm in the oscillation wavelength), the system is configured so that the semiconductor laser can be subjected to frequency modulation. Whether or not frequency modulation is provided is switched with high speed by switching on or off the selection switch 156.

Next, an explanation will be provided of a method for highly accurately measuring an absolute distance over a wide range of measurement in the above-described configuration.

First, if the frequency modulation selection switch 156 is switched on in order to measure an absolute position in an arbitrary position, the injection current into the semiconductor laser 11a changes with a frequency $f_m$, and the semiconductor laser 11a oscillates an FM modulation signal having an oscillation frequency variation width $\pm \Delta f_1$ in accordance with the change. The oscillated light beam passes the beam splitter 2 and the beam splitter 31. One of the divided light beams incident upon the AO modulator 104a is subjected to a shift of frequency $F_1$ in its frequency to become a reference light beam. Another light beam incident upon the AO modulator 104b is subjected to a shift of frequency $F_2$ in its frequency to become a measured light beam. A beat frequency $F_1-F_2$ produced by interference between the reference light beam and the measured light beam is detected by the photodetector 71a, and a phase difference $\phi_1$ from a reference signal is output.

In this case, since the oscillation frequency is modulated with the width of $\pm \Delta f_1$ (the modulation width of the wavelength is $\Delta\lambda_1$), the phase difference signal $\phi_1$ varies with the frequency $f_m$ of the oscillator 154. The variation width $\Delta\phi_1$ has a direct relationship with the optical path l of the interferometer. That is:

$$2\pi l = (2n_1\pi + \phi')(\lambda_1 - \Delta\lambda_1/2) \qquad (3)$$

$$2\pi l = (2n_2\pi + \phi'')(\lambda_1 + \Delta\lambda_1/2) \qquad (4).$$

After multiplying expression (3) by $(\lambda_1 + \Delta\lambda_1/2)$ and expression (4) by $(\lambda_1 - \Delta\lambda_1/2)$, the difference between the two expressions results in:

$$2\pi l = \{2\pi(n_1-n_2) + \Delta\phi_1\} \cdot \lambda_{eq1} \qquad (5),$$

where $\Delta\phi_1 = \phi' - \phi''$, $\phi'$: a phase corresponding to a length of non-integer multiple of the wavelength in the length $2\pi l$ when the wavelength is $\lambda_1 - \Delta\lambda_1/2$, $\phi''$: a phase corresponding to a length of non-integer multiple of the wavelength in the length $2\pi l$ when the wavelength is $\lambda_1 + \Delta\lambda_1/2$, $\lambda_{eq1} = \lambda_1^2/\Delta\lambda_1$, $n_1$, $n_2$: natural numbers. Accordingly, as described above, since the width within which the oscillation wavelength of the semiconductor laser varies while keeping a proportional relationship is about 0.05 nm or less, if it is arranged that $\lambda_1 = 680$ nm, and $\Delta\lambda_1 = 0.02$ nm, we obtain $\lambda_{eq1} = \lambda_1^2/\Delta\lambda_1 = 23.0$ nm. If the range of measurement is within this range, that is, if it is set so that the maximum variation width of the value l to be measured is 23.0 mm or less, $n_1$-$n_2$ is uniquely determined, since there is always only one ($n_1$-$n_2$) corresponding to the measured value $\Delta\phi_1$ within this range. After all, the optical path difference l is calculated from expression (5) by measuring $\Delta\phi_1$.

However, accuracy in measurement in this case is only about 10–20 μm. The accuracy can be increased by the following approach. The frequency modulation selection switch 156 is switched off at high speed. Using the wavelength $\lambda_1$ oscillated by the semiconductor laser 11a and the wavelength $\lambda_2$ oscillated by the semiconductor laser 11b, phase differences are independently measured in the manner described above, and the difference $\Delta\phi$ between them is output. The output $\Delta\phi$ also has a direct relationship with the optical path difference l of the interferometer. That is, $$2\pi l = (2m_1\pi + \phi_1)\lambda_1 \qquad (6)$$

$$2\pi l = (2m_2\pi + \phi_2)\lambda_2 \qquad (7).$$

After multiplying expression (6) by $\lambda_2$ and expression (7) by $\lambda_2$, the difference between the two expressions results in:

$$2\pi l = \{2(m_1 - m_2)\pi + \Delta\phi_1\} \cdot \lambda_{eq2} \qquad (8),$$

where $\Delta\phi = \phi_1 - \phi_2$, $$\lambda_{eq2} = \lambda_1 \cdot \lambda_2 / |\lambda_1 - \lambda_2|.$$

$m_1, m_2$: natural numbers. Accordingly, if light beams having $\lambda_1 = 680$ nm and $\lambda_2 = 675$ nm are used, we obtain $\lambda_{eq2} = \lambda_1 \cdot \lambda_2 / (\lambda_1 - \lambda_2) = 91.8$ μm, and $m_1 - m_2$ is uniquely determined within this range. Since the optical path difference l has already been measured with the accuracy in measurement of 10–20 μm in the above-described measurement by frequency modulation, there is always only one $(m_1 - m_2)$ corresponding to this coarse measured value of l and the measured value $\Delta\phi$. Hence, $m_1 - m_2$ is uniquely determined. Accordingly, the value of l is obtained by measuring $\Delta\phi$ and substituting the value $\Delta\phi$ in expression (8). Accuracy in measurement in this case becomes about 0.1 μm.

Furthermore, if the phase difference data $\phi_1$ of the semiconductor laser 11a is used in this state, the optical path difference l can be obtained from expression (6). Since the above-described accuracy in measurement is 0.1 μm for $\lambda_1 = 680$ nm (=0.68 μm), there is always only one $m_1$ corresponding to the measured value of l in this accuracy and the measured value $\phi_1$. Hence, $m_1$ can also be uniquely determined, and it becomes possible to measure the optical path difference l with an accuracy of about 1 nm.

Figure 3:
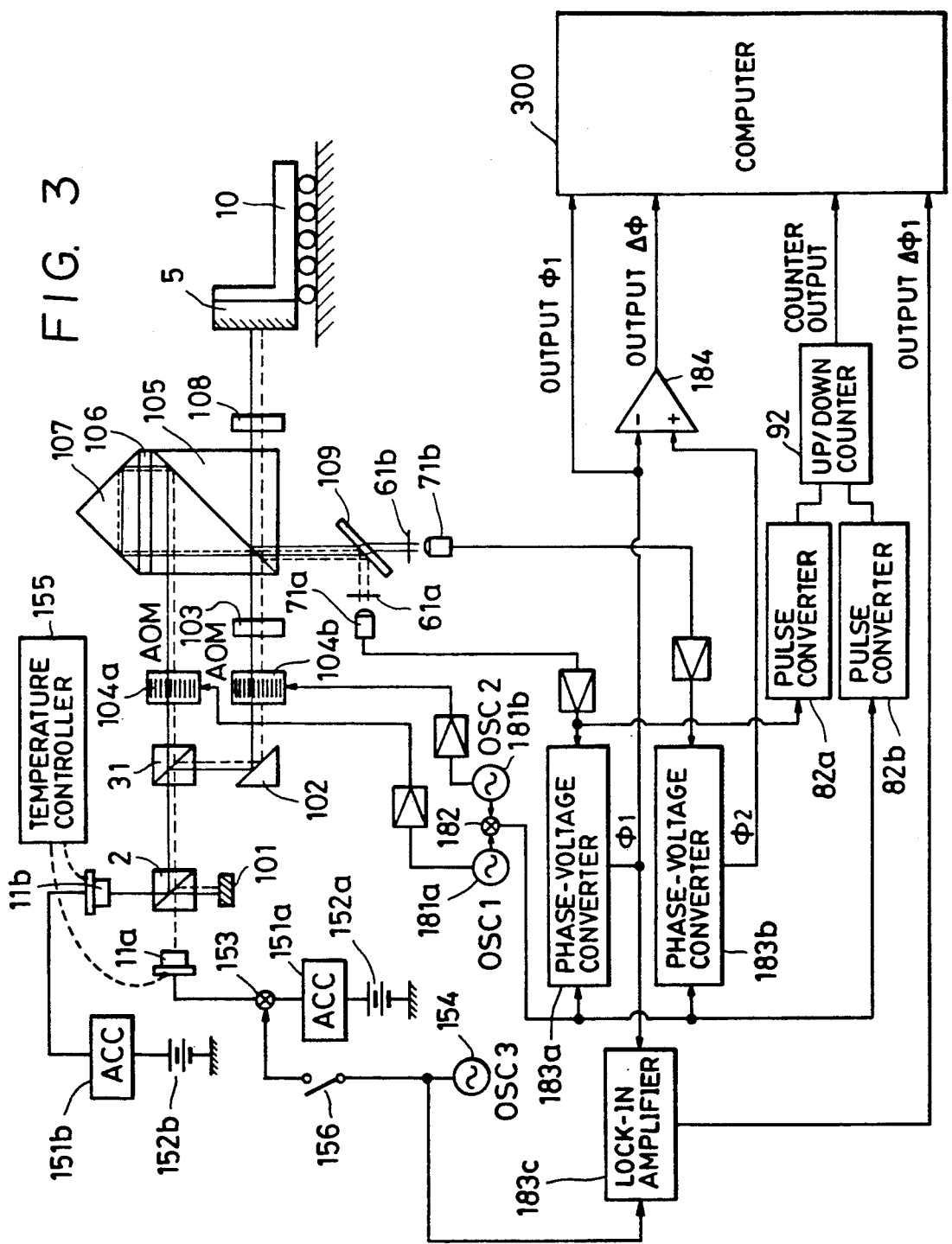
FIG. 3 is a diagram showing the configuration of the semiconductor-laser length measuring apparatus including an incremental measuring unit according to the first embodiment of the present invention.

FIG. 3 is a diagram showing the configuration of the apparatus including an incremental measuring unit and the like according to the first embodiment of the present invention.

In FIG. 3, high-speed pulse converters 82a and 82b convert sinusoidal waves into pulse trains. An up/down counter 92 performs addition/subtraction of the number of input pulses. There is also shown a lock-in amplifier 183c. Other like components as those shown in FIG. 2 are indicated by like numerals.

A beat signal obtained from a light beam having a frequency $f_1 + F_1$ and a light beam having a frequency $f_1 + F_2$ is converted into a pulse train by the pulse converter 82a. A signal having a difference frequency between the modulation components $F_1$ and $F_2$ by the AO modulators is converted into a pulse train by the pulse converter 82b. The two pulse-train signals are input to the up/down counter 92, which counts the difference between the numbers of pulses. Thus, according to the same principle as that in the above-described conventional example, the amount of movement of the stage 10 is incrementally measured.

An injection current signal for the semiconductor laser 11a is converted into a voltage signal by a current-voltage converter (not shown). Making this voltage signal a reference signal, the signal variation width $\Delta\phi_1$ of the output $\phi_1$ from the phase-voltage converter 183a is detected by the lock-in amplifier 183c.

In the present embodiment, an absolute position is first detected according to the procedure explained with reference to FIG. 2, and an amount of displacement from the detected absolute position is then measured by the above-described incremental measuring unit. That is, the high-speed pulse converters 82a and 82b and the up/down counter 92 are provided so as be able to follow a high-speed movement of the stage 10 from the absolute position detected by the above-described method of detecting an absolute position. It is thus possible to perform incremental measurement.

A computer 300 takes in the outputs $\Delta\phi_1$, $\Delta\phi$ and $\phi_1$, and performs the calculation for obtaining the absolute position. The computer 300 then takes in the output from the up/down counter 92, calculates the amount of displacement from the absolute position, and obtains the current position.

It takes a certain time for the determination of the absolute position of the stage 10, and the stage must stand still in the order of submicrons during the determination.

Accordingly, a high-speed movement of the stage can be followed more easily, if such absolute determination of the absolute position of the stage is at first performed only once, and the subsequent measurement is performed by a usual incremental measurement of a length using a laser. Hence, by referring to an output from the up/down counter 92 obtained by counting a difference between a measured signal Sig and a reference signal Ref converted into pulses by the high-speed converters 82a and 82b, it becomes possible to perform incremental measurement of a length from a position the absolute position of which has been measured. As a result, high-speed measurement of an absolute position is also realized.

If the laser light is shut off for some trouble to cause a count error, the sequence for determining an absolute position may be resumed at that position. It is unnecessary to return the stage up to the position of an origin sensor to reset measurement, as in conventional cases.

Furthermore, since incremental measurement is performed using the same light sources, detectors and the like as those when an absolute position is measured, the apparatus becomes simplified. Moreover, since the same optical paths for the light beams for measurement can be used, the incident positions of the light beams on the mirror 5, which become reference positions for measuring a position or a displacement, are completely identical. Hence, no error in position detection due to switching occurs, even when one switches from measurement of an absolute position to incremental measurement. That is, when, for example, an optical path of a light beam for measuring an absolute position differs from an optical path for incremental measurement, and incident positions of the respective light beams on the mirror 5 are different, a difference occurs between respective measured positions and amounts of displacement, if a difference has occurred between the amounts of displacement from respective incident positions as in a case in which the stage was tilted. This difference becomes an error in the measurement of a length as a whole. In the present apparatus, however, since the optical paths are identical, such an error never occurs.

EXAMPLE 2

Figure 4:
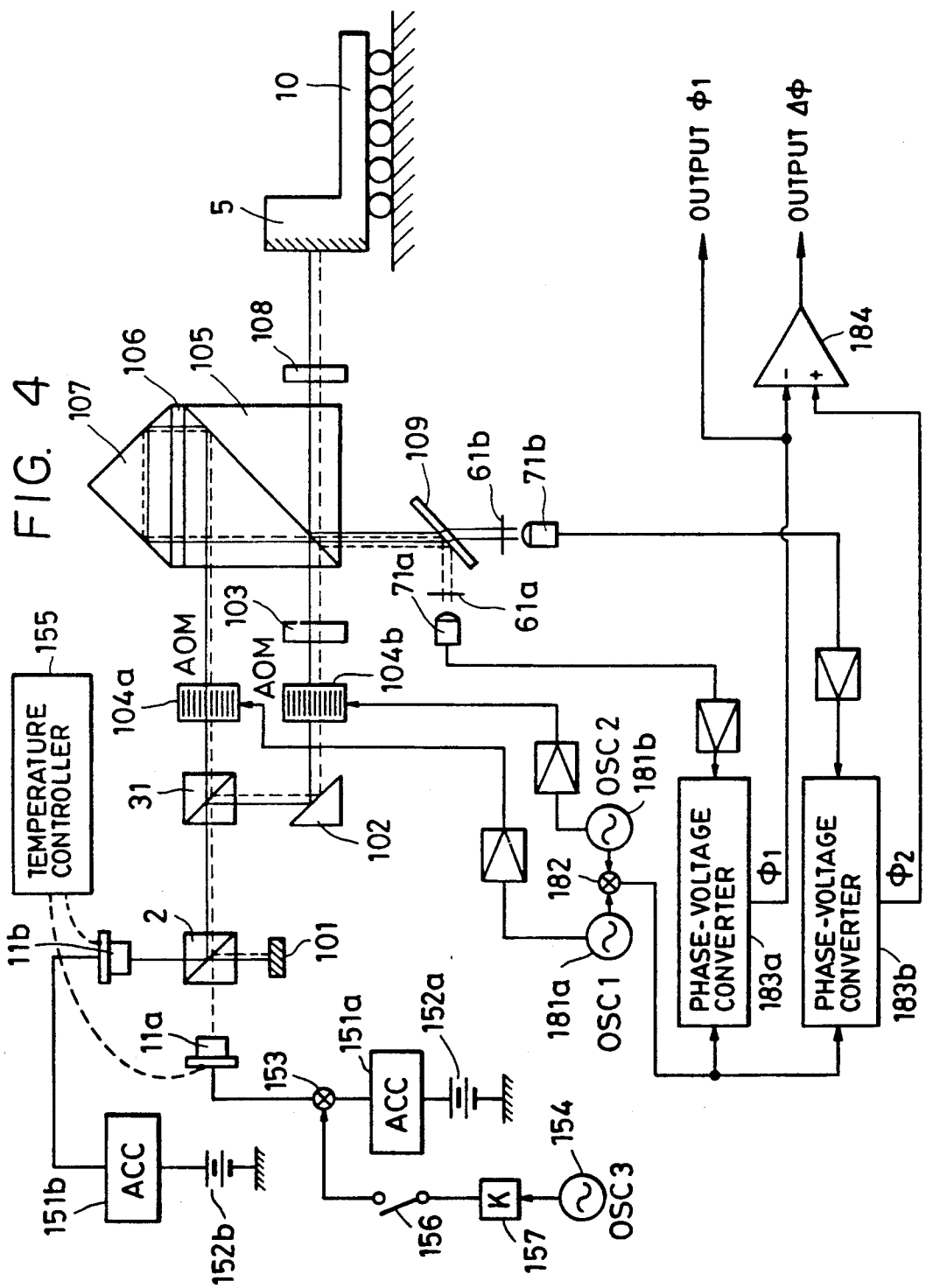
FIG. 4 is a diagram showing the configuration of a semiconductor-laser length measuring apparatus according to a second embodiment of the present invention.

FIG. 4 shows an absolute position measuring unit according to a second embodiment of the present invention.

In FIG. 4, a gain adjusting circuit 157 continuously or discontinuously switches the gain of the oscillator 154. Other components are totally identical to those in the first embodiment.

In the present configuration, a method for measuring an absolute position is almost identical to the method explained in the first embodiment. That is, by first switching on the frequency modulation selection switch 156, the semiconductor laser 11a is subjected to FM modulation, and an absolute position is coarsely measured. If the gain of the oscillator 154 is constant, the magnitude of $\Delta\lambda_1$ in the above-described expressions (3) and (4) is constant. Accordingly, if, for example, $\Delta\lambda_1=0.02$ nm as explained in the first embodiment, $\lambda_{eq}=23.1$ mm, and hence the range of measurement becomes shortened. In the present embodiment, it is arranged so that, for example, a gain $K_1$ for providing the amplitude of injection current corresponding to $\Delta\lambda_1=0.02$ nm and a gain $K_2$ for providing the amplitude of injection current corresponding to $\Delta\lambda_1=0.0001$ nm can be switched by the gain adjusting circuit 157 for adjusting the gain of the oscillator 154. It is thereby possible to make $\lambda_{eq}=\lambda_1^2/\Delta\lambda_1=4.6$ mm in the case of the gain $K_1$, and $\lambda_{eq}=\lambda_1^2/\Delta\lambda_1=23.1$ mm in the case of the gain $K_2$. Accordingly, it is possible to cover a longer range of measurement without providing a new light source.

The gain may be switched between two or more values. Hence, it is theoretically possible to cover an infinitely long range of measurement. In practice, however, a range within which highly accurate measurement can be performed is limited by a coherent distance of a semiconductor laser, serving as a light source.

As for an incremental measuring unit, outputs from the photodetector 71a and the mixer 182 are input to the pulse converters 82a and 82b, respectively, as shown in FIG. 3, and outputs from the respective pulse converters are input to the up/down converter 92. The configuration, operation and procedure of measurement of this portion, the lock-in amplifier 183c and the computer 300 are identical to those in the first embodiment, and an explanation thereof will be omitted.

EXAMPLE 3

Figure 5:
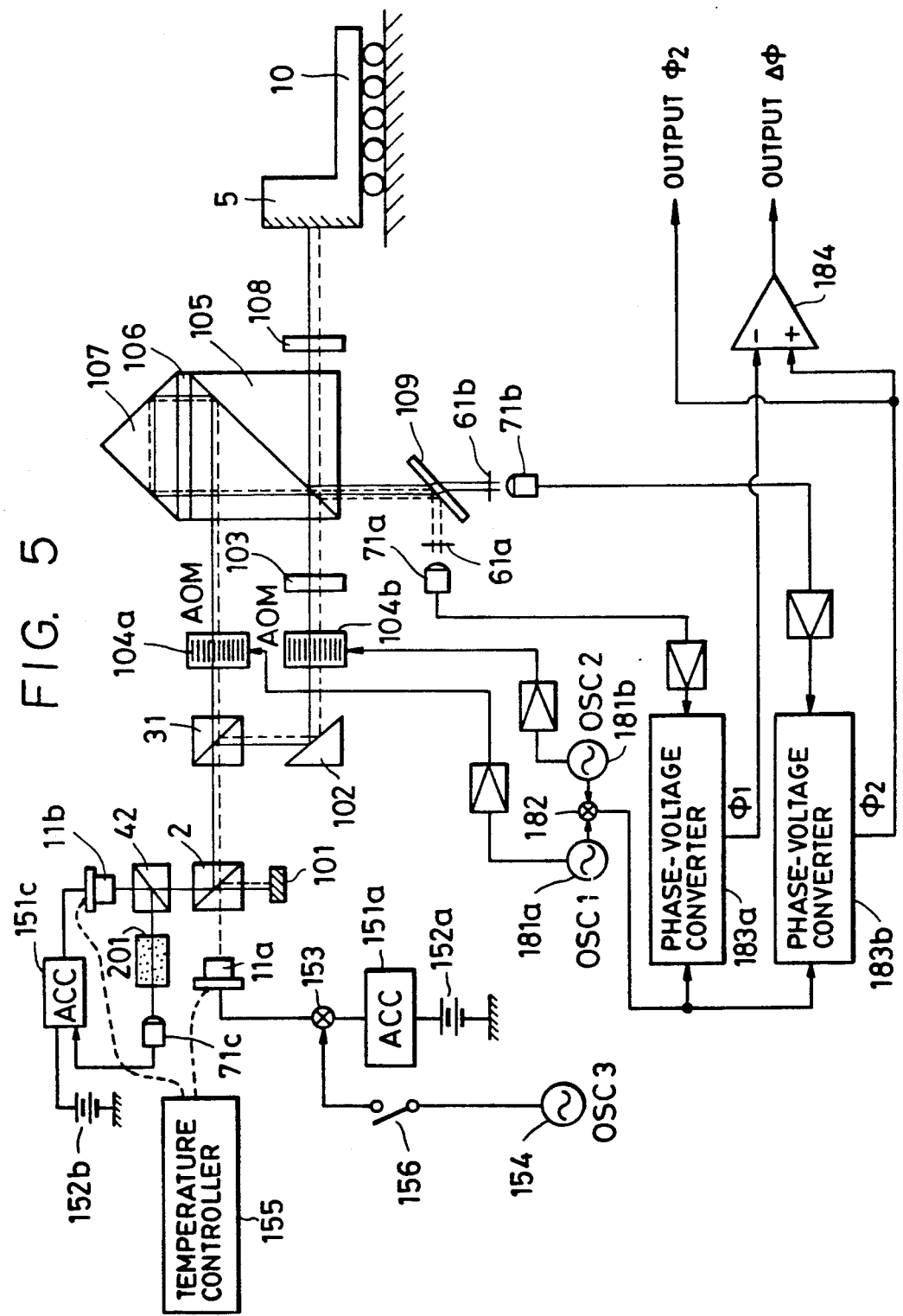
FIG. 5 is a diagram showing the configuration of a semiconductor-laser length measuring apparatus according to a third embodiment of the present invention.

FIG. 5 shows a measuring unit of an absolute position according to a third embodiment of the present invention.

In FIG. 5, there are shown a beam splitter 42, a photodetector 71c, an injection current control circuit 151c for semiconductor laser 11b, and a gas cell 201 sealing a gas, such as methane, iodine or the like. Except that these components are added, and a phase difference $\phi_1$ between a signal from the semiconductor laser 11b and a reference signal is output as a phase output, the configuration of the apparatus of the present embodiment is totally identical to that of the first embodiment, including an incremental measuring unit (not shown) and the like. The present embodiment is an example of the configuration when it is necessary to measure a length with a higher accuracy.

In general, as described above, stabilization of the wavelength of a semiconductor laser is simply performed by performing temperature control and control to maintain injection current constant. However, in order to obtain a more strict stability, for example, a wavelength stability of $10^{-8}$–$10^{-10}$, it is desirable to provide a feedback control using some physical standard.

The present embodiment is an example in which molecular absorption lines of a gas, such as methane, iodine or the like, are used as the physical standard.

In FIG. 5, a part of the light beam emitted from the semiconductor laser 11b and divided by the beam splitter 42 passes the gas cell 201, and is detected by the photodiode (photodetector) 71c. Since a gas having a molecular absorption line close to the oscillation wavelength of the semiconductor laser 11b is sealed in the gas cell 201, the intensity of the light beam sharply changes near the oscillation wavelength. That is, if the oscillation wavelength shifts from the absorption wavelength, the output from the photodetector 71c increases. Accordingly, by changing the injection current by performing feedback control of the injection current control circuit 151c, for example, so as to decrease the current if the output from the photodetector 71c has increased, utilizing the output from the photodetector 71c, it is possible to maintain the wavelength of the semiconductor laser 11b with a very high stability. For example, in the case of a wavelength stability of $10^{-8}$, a distance of 1 m can be measured with an accuracy of 10 nm. Hence, it is possible to realize an absolute-distance measuring apparatus having an extremely high accuracy.

Although a gas cell is used as a physical standard in the present embodiment, an etalon plate, a wavelength selection filter, and the like, may also be used in accordance with the accuracy required.

EMBODIMENT 4

Figure 6:
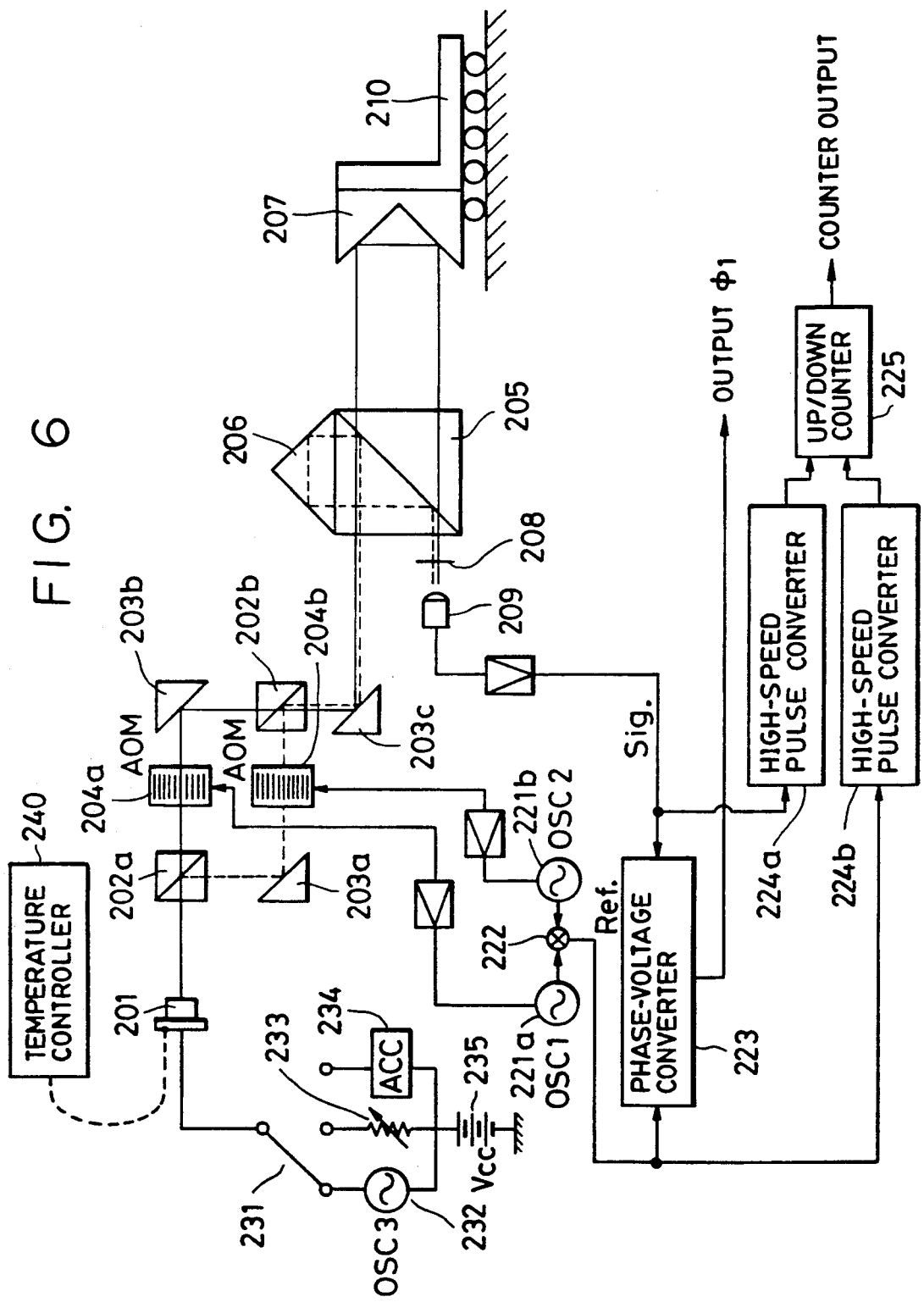
FIG. 6 is a diagram showing the configuration of a semiconductor-laser length measuring apparatus according to a fourth embodiment of the present invention.

FIG. 6 shows a fourth embodiment of the present invention.

In FIG. 6, there are shown a semiconductor laser 201, serving as a light source, having a basic oscillation frequency $\lambda_0$, polarizing beam splitters 202a and 202b, and light-beam deflecting mirrors 203a, 203b and 203c. AO modulators 204a and 204b provides incident light beams with shifts of frequencies $F_1$ and $F_2$, respectively. There are also shown a fixed corner cube 206, a movable corner cube 207, a polarizer 208, a photodiode 209, and a stage device 210. Oscillators 221a and 221b oscillate signals having frequencies $F_1$ and $F_2$, respectively. A frequency mixer 222 mixes signals having two different frequencies, and outputs a signal having a frequency of the difference between the two frequencies. A phase-voltage converter 223 converts a phase difference between two synchronized signals into a voltage and output the voltage. High-speed pulse converters 224a and 224b convert sinusoidal signals into pulse trains at high speed. An up/down counter 225 performs addition/subtraction of the numbers of input pulses. A switch 231 selects an injection current source for the semiconductor laser 201. A modulator 232 modulates the injection current within a range in which the oscillation wavelength of the semiconductor laser 201 continuously changes. A wavelength selection circuit 233 changes the injection current within a range in which the oscillation wavelength of the semiconductor laser 201 discontinuously changes. A current control circuit 234 controls the injection current so that the oscillation wavelength of the semiconductor laser 201 is constant. A power supply 235 supplies the semiconductor laser 201 with electric power. A temperature controller 240 controls so as to keep the temperature of the semiconductor laser 201 constant.

In the above-described configuration, a coherent light beam emitted from the semiconductor laser 201 is incident upon the polarizing beam splitter 202a in a linearly polarized state in the direction of 45°, and is divided into a polarizing component parallel to the plane of the drawing and a polarizing component perpendicular to the plane of the drawing.

The light beam of the polarizing component parallel to the plane of the drawing goes straight, passes the AO modulator 204a, where the frequency of the light beam is shifted by $F_1$, and is incident upon the polarizer 208 via the light-beam deflecting mirror 203b, the polarizing beam splitter 202b, the light-beam deflecting mirror 203c, the polarizing beam splitter 205, the corner cube 207 and the polarizing beam splitter 205.

On the other hand, the light beam of the polarizing component perpendicular to the plane of the drawing is downwardly deflected, passes the light-beam deflecting mirror 203a, passes the AO modulator 204b, where the frequency of the light beam is shifted by $F_2$, and is incident upon the polarizer 208 via the polarizing beam splitter 202b, the light-beam deflecting mirror 203c, the polarizing beam splitter 205, the corner cube 206 and the polarizing beam splitter 205.

These two light beams interfere with each other by the function of the polarizer 208, and a beat signal Sig having a frequency $F_1-F_2$ is detected by the photodetector 209. A phase difference $\phi_1$ between the detected beat signal Sig and a signal Ref, which is obtained by mixing signals from the oscillators 221a and 221b driving the AO modulators 204a and 204b, respectively, by the frequency mixer 222, is detected by the phase-voltage converter 223.

The two signals Sig and Ref are converted into pulse trains in the high-speed pulse converters 224a and 224b, respectively. The up/down counter 225 performs addition/subtraction of the numbers of respective pulses, and outputs the result.

The system is configured so that the current supplied to the semiconductor laser 201 is obtained by arbitrarily and promptly switching by the selection switch 231 among the circuit 232 for modulating the current within a range within which the oscillation wavelength of the semiconductor laser 201 continuously changes, the circuit 233 for changing the current within a range in which the oscillation frequency of the semiconductor laser 201 discontinuously changes, and the circuit 234 for controlling the current so that the oscillation frequency of the semiconductor laser 201 is constant.

Furthermore, the semiconductor laser 201 is maintained within temperature variations of about $\pm 0.001°$ C. by the precise temperature controller 240 utilizing, for example, Peltier elements and thermistors, in order to keep the temperature constant.

A method for measuring an absolute position of the stage 10 will now be explained.

Figure 7:
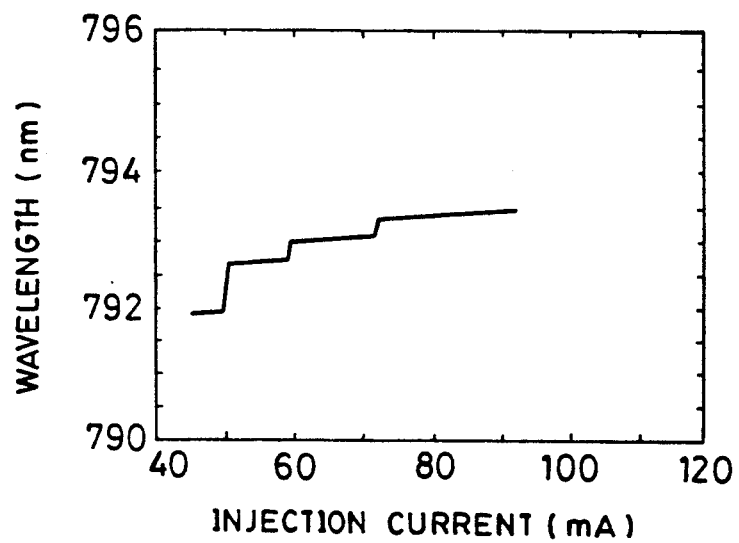
FIG. 7 is a diagram for explaining a characteristic of a semiconductor laser.

In general, a semiconductor laser has an injection current-oscillation wavelength characteristic as shown in FIG. 7. Accordingly, if, for example, the injection current is modulated about $\pm 1$ mA around 80 mA, the oscillation wavelength changes about $\pm 6 \times 10^{-3}$ nm around about 793.3 nm. Frequency modulation is thus performed. If the injection current is changed about $\pm 10$ mA around 70 mA, it is possible to change the oscillation wavelength about 0.6 nm including discontinuous changes due to mode hop.

It is also known that the oscillation wavelength of a semiconductor laser can be stabilized in the order of $10^{-8}$, if temperature variations and variations in injection current are suppressed within about $\pm 0.001°$ C. and $\pm 1$ μA, respectively.

Using such a semiconductor laser 201, the selection switch 231 first selects the circuit 232 for modulating current within a range in which the oscillation wavelength continuously changes. If it is assumed that the central frequency is $\lambda_1$, and the width of modulation of the wavelength is $\pm \Delta \lambda_1 / 2$, the relationship between the optical path 1 and the phase signal $\phi$ is expressed by expressions (3)–(5), as shown in the first embodiment.

Accordingly, if the width of the phase output $\phi_1$ varying in synchronization with the modulation frequency $f_3$ of the circuit 232, that is, $\Delta \phi_1$ is measured by, for example, the above-described lock-in amplifier, the natural number $n_1 - n_2$ in expression (5) is uniquely determined within the range of an equivalent wavelength $\lambda_{eq1}$, which is much larger than the wavelength of the laser, and hence the optical path difference 1 can be measured.

For example, if $\lambda_1 = 793$ nm and $\Delta \lambda_1 = 0.001$ nm, $\lambda_{eq1} = \lambda_1^2 / \Delta \lambda_1 = 628$ mm. If the width of the range of measurement of 1 is within this value, that is, if the width of the maximum variation of 1 is set to 628 mm, $n_1 - n_2$ is is uniquely determined. If $\Delta \phi_1$ at this time is measured, the optical path difference 1 can be measured with an accuracy determined by an accuracy in the measurement of a phase. If the accuracy in the measurement of a phase is $2\pi / 2000$, the optical path difference 1 can be measured with an accuracy of about 0.3 mm.

Next, the selection switch 231 switches to the circuit 233 for changing the injection current within a range in which the oscillation wavelength discontinuously changes. If the circuit 233 has a function of changing the oscillation wavelength between $\lambda_L$ and $\lambda_H$ including mode hop at a certain frequency $f_4$, the relationship between the optical path difference 1 and the phase difference signal $\phi$ is expressed by:

$$2\pi l = (2m_1\pi + \phi_L) \cdot \lambda_L \qquad (9)$$

$$2\pi l = (2m_2\pi + \phi_H) \cdot \lambda_H \qquad (10).$$

After multiplying expressions (9) and (10) by $\lambda_H$ and $\lambda_L$, respectively, the difference between the two expressions results in:

$$2\pi l = \{2\pi(m_1 - m_2) + \Delta\phi'\} \cdot \lambda_{eq2} \qquad (11),$$

where $\Delta\phi' = \phi_L - \phi_H$, $$\lambda_{eq2} = \lambda_L \cdot \lambda_H / |\lambda_L - \lambda_H|,$$

$m_1$, $m_2$: natural numbers. Accordingly, if the phase difference signal $\Delta\phi'$ changing in synchronization with the frequency $f_4$ is measured, the natural number $m_1 - m_2$ is uniquely determined within the range of an equivalent wavelength $\lambda_{eq2}$, which is a little larger than the wavelength of the laser, and hence the optical path difference 1 can be more precisely measured. For example, if $\lambda_L = 792.7$ nm and $\lambda_H = 793.3$ nm, $\lambda_{eq2} = \lambda_L \cdot \lambda_H / |\lambda_H - \lambda_L| = 1.05$ mm. Since the absolute value of 1 has already been obtained with the accuracy of about 0.3 mm, $m_1 - m_2$ is uniquely determined. If the accuracy in the measurement of a phase at this time is assumed to be $2\pi / 2000$, the optical path difference 1 can be measured with an accuracy of about 0.5 μm.

Finally, the switch 231 switches to the circuit 234 for controlling so as to maintain the oscillation wavelength constant.

If the circuit 234 controls the oscillation wavelength at $\lambda_C$, the relationship between the optical path difference 1 and the phase difference signal $\phi$ is expressed by:

$$2\pi l = (2\pi N + \phi) \cdot \lambda_C.$$

where N: natural number. Hence, it is possible to determine 1 with a very high accuracy. For example, if $\lambda_C = 793$ nm, since 1 has already been measured with the accuracy of about 0.5 μm (=500 nm), N can be uniquely determined. If the accuracy in the measurement of a phase at this time is assumed to be $2\pi / 2000$, the optical path difference l can be measured with an accuracy of about 0.4 nm. After all, the optical path difference l can be absolutely measured with the accuracy of 0.4 nm in the range of 628 mm.

However, the determination of an absolute position of the stage 210 by such a switching method takes a certain time, and the stage must stand still in the order of submicrons during the determination.

Accordingly, it is easier to follow a high-speed movement of the stage, if the determination of an absolute position of the stage 210 by such a switching method is first performed only once, and the subsequent measurement is performed by a usual incremental measurement of a length by a laser, as in the first embodiment. Hence, by referring to an output from the up/down counter 225 obtained by counting the difference between the measured signal Sig and the reference signal Ref converted into pulses by the high-speed pulse converters 224a and 224b, respectively, it becomes possible to perform incremental measurement of a length from a position the absolute position of which has been measured, as in the first embodiment. As a result, a high-speed measurement of an absolute position is also realized.

If the laser light is shut off for some trouble to cause a count error, the sequence for determining an absolute position may be resumed at that position. It is unnecessary to return the stage up to the position of an origin sensor to reset measurement, as in conventional cases.

A computer for performing the above-described processing of measurement and calculation is omitted in FIG. 6.

EMBODIMENT 5

Figure 8:
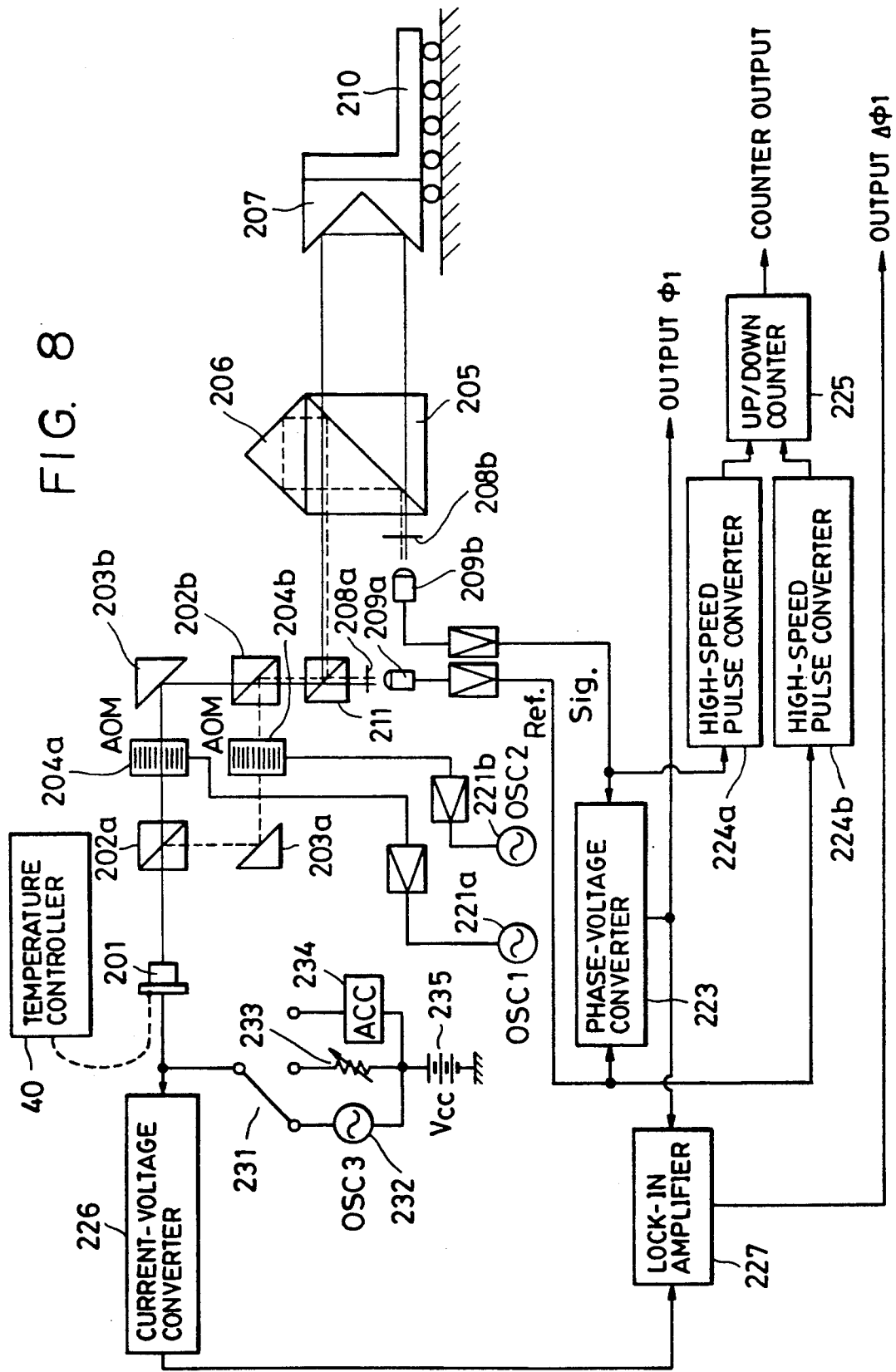
FIG. 8 is a diagram showing the configuration of a semiconductor-laser length measuring apparatus according to a fifth embodiment of the present invention.

FIG. 8 shows a fifth embodiment of the present invention. In FIG. 8, there are shown a beam splitter 211, and a current-voltage converter 226 having high input impedance. A lock-in amplifier 227 detects with high accuracy only the amplitude of a signal synchronized with a reference signal. Other like components as those shown in FIG. 6 are indicated by like numerals.

In the above-described configuration, a coherent light beam emitted from the semiconductor laser 201 is incident upon the polarizing beam splitter 202a in a linearly polarized state in the direction of 45°, and is divided into a polarizing component parallel to the plane of the drawing and a polarizing component perpendicular to the plane of the drawing, as in the fourth embodiment. The light beam of the polarizing component parallel to the plane of the drawing goes straight, passes the AO modulator 204a, where the frequency of the light beam is shifted by $F_1$, and reaches the light-beam deflecting mirror 203b, the polarizing beam splitter 202b and the beam splitter 211, where the light beam is divided into a light beam incident upon the polarizer 208a, and a light beam incident upon the polarizer 208b via the polarizing beam splitter 205, the corner cube 207 and the polarizing beam splitter 205.

On the other hand, as in the fourth embodiment, the light beam of the polarizing component perpendicular to the plane of the drawing is downwardly deflected, passes the light-beam deflecting mirror 203a, passes the AO modulator 204b, where the frequency of the light beam is shifted by $F_2$, and reaches the polarizing beam splitter 202b, and the beam splitter 211, where the light beam is divided into a light beam incident upon the polarizer 208a, and a light beam incident upon the polarizer 208b via the polarizing beam splitter 205, the corner cube 206 and the polarizing beam splitter 205.

Among these light beams, the two light beams incident upon the polarizer 208a interfere with each other by the function of the polarizer 208a, and a beat signal Ref having a frequency $F_1 - F_2$ is detected by the photodetector 209a. The two light beams incident upon the polarizer 208b interfere with each other by the function of the polarizer 208b, and a beat signal Sig having a frequency $F_1 - F_2$ is detected by the photodetector 209b. The phase difference $\phi$ between the signal Ref and the signal Sig is detected by the phase-voltage converter 223. The two signals Sig and Ref are converted into pulse trains by the high-speed pulse converters 224a and 224b, respectively. The up/down counter 225 performs addition/subtraction of the numbers of respective pulses, and outputs the result.

As in the fourth embodiment, the system is configured so that the current supplied to the semiconductor laser 201 is obtained by arbitrarily and promptly switching by the selection switch 231 among the circuit 232 for modulating the current within a range in which the oscillation wavelength of the semiconductor laser 201 continuously changes, the circuit 233 for changing the current within a range in which the oscillation frequency of the semiconductor laser 201 discontinuously changes, and the circuit 234 for controlling the current so that the oscillation frequency of the semiconductor laser 201 is constant.

Furthermore, the semiconductor laser 201 is maintained within temperature variations of about ±0.001° C., in the same manner as in the fourth embodiment.

An injection-current signal for the semiconductor laser 201 becomes a voltage signal by the current-voltage converter 226. Making this signal a reference signal, the width of variations of the signal of the output $\phi_1$ from the phase-voltage converter 223 is detected by the lock-in amplifier 227.

Also in the present configuration, an absolute optical path difference is measured by a method almost identical to that in the first or fourth embodiment. The method in the present embodiment differs only in that a reference signal for the phase-voltage converter 223 is extracted from the output from the photodetector 209a, and the width of variations of the phase signal when the injection current for the semiconductor laser 201 is modulated is detected by the lock-in amplifier 227.

By thus extracting a reference signal for the phase-voltage converter 223 from thre photodetector 209a, it is possible to eliminate the influence of variations in the optical path difference in the optical path closer to the semiconductor laser 201 than the beam splitter 211, though circuitry becomes more or less complicated.

Furthermore, by detecting the width of variations of the phase signal by the lock-in amplifier 227, it becomes possible to satisfactorily measure the width $\Delta\phi$ of variations even if noise is superposed in the output $\phi_1$ from the phase-voltage converter 223.

As another aspect of the present invention, by making the width of modulation of the current injected into the semiconductor laser variable, that is, by providing a circuit for arbitrarily setting the gain of the AC component of the injection current, as described above, the entirely same effects may also be obtained.

As for stabilization of the oscillation wavelength of the semiconductor laser, it is possible to realize highly accurate stabilization using a method of controlling the oscillation wavelength by adjusting it to a molecular absorption line of a gas cell of methane, iodine or the like, a method of controlling the oscillation wavelength by adjusting it to a resonsance peak of a light beam passing an etalon plate, and the like.

The operation of incremental measurement is the same as that in the fourth embodiment.

A computer performing the above-described calculation processing is omitted is FIG. 8.

Among the above-described embodiments, according to an aspect including semiconductor lasers for oscillating two different wavelengths, means for performing frequency modulation of the semiconductor lasers, and a switch for selecting whether or not frequency modulation is performed, (1) it becomes possible to perform absolute measurement of a long range of measurement with high accuracy and with a small number of light sources, (2) when an absolute position is measured, it becomes possible to perform measurement without changing an optical system and a signal detection system at all, and (3) when an absolute position is measured, high-speed switching of a range of measurement becomes possible, and hence a mistake in the determination of the part of a natural number in expression (8) caused by the movement of an object to be measured during the determination becomes hard to occur.

Furthermore, by adding means for freely changing the width of frequency modulation, that is, the amplitude of injection current, (4) absolute measurement of a range of measurement longer than several meters with high accuracy becomes possible without increasing the number of light sources, (5) by providing both pulse converters and an up-/down counter, incremental measurement of a displacement becomes possible after absolute measurement has one been performed, and hence it becomes possible to perform a measurement which can satisfactorily follow a high-speed movement of a stage or the like.

In an aspect using only one semiconductor laser, by providing means for modulating the injection current for the semiconductor laser within a range in which the oscillation frequency continuously changes, means for changing the current within a range in which the oscillation frequency discontinuously changes, and means for controlling so as to maintain the oscillation frequency constant, and by sequentially measuring an absolute optical path difference by means for arbitrarily selecting among the above-described means, (1) it becomes possible to measure a long range of measurement with high accuracy using only one semiconductor laser, (2) in the case of performing heterodyne detection using AO modulators, it is possible to perform measurement without being influenced by variations in the intensity of the light beam from the semiconductor laser, and (3) by combining with incremental measurement, if absolute measurement has first been performed, it becomes possible to perform measurement by following a high-speed relative displacement from the point of the absolute measurement.

What is claimed is:

1. A length measuring apparatus for measuring a distance up to an object to be measured, comprising:

first light projection means for projecting a light beam having a first frequency onto the object to be measured;

first phase detection means for detecting a phase of a light beam incident upon a predetermined position from said first light projection means via the object to be measured;

second light projection means for projecting a light beam having a second frequency different from the first frequency onto the object to be measured;

second phase detection means for detecting a phase of a light beam incident upon a predetermined position from said second light projection means via the object to be measured;

a distance up to the object to be measured being detected at least according to results of detection by said first phase detection means and second phase detection means;

third light projection means for projecting a light beam having a third frequency onto the object to be measured; and third phase detection means for detecting a phase of a light beam incident upon a predetermined position from said third light projection means via the object, a relative amount of displacememt of the object from the position of which the distance up to the object is detected according to the results of the detection by said first and second phase detection means being detected according to a result of detection by said third phase detection means;

the light beam whose phase is detected by said third phase detection means and the light beam whose phase is detected by said first phase detection means having an indentical optical path.

2. A length measuring apparatus according to claim 1, wherein said first light projection means and said third light projection means include a common light source, and wherein said first phase detection means and third phase detection means include a common photodetector for detecting a light beam emitted from the common light source.

3. A length measuring apparatus according to claim 2, wherein a result of detection by the common photodetector for detecting the light beam emitted from the common light source is used for detecting a relative distance up to the object, and is then used for detecting a relative displacement from said detected position of the object.

4. A length measuring apparatus according to claim 2, wherein said second light projecting means comprises a light source, said light source being common with said common light source of said first and third light projecting means and further comprising means for changing a frequency of the light emitted from said common light source.

5. A length measuring apparatus according to claim 4, wherein said frequency changing means performs frequency modulation so that the frequency of the light beam changes between a first frequency and a second frequency with a predetermined frequency.

6. A length measuring apparatus according to claim 5, wherein said first phase detection means and second phase detection means includes the common photodetector for detecting the light beam emitted from said common light source, phase change detection means for detecting a phase change in an output signal from photodetector, and a lock-in amplifier for detecting a width of variation of an output signal from said phase change detection means, wherein a relative distance up to the object to be measured is detected by the width of variations of the signal detected by said lock-in amplifier.

7. A length measuring apparatus according to claim 4, wherein said common light source is a semiconductor laser, and wherein said frequency changing means changes the frequency of the light beam at least to said first frequency and said second frequency by changing an injection current for said semiconductor laser.

8. A length measuring apparatus according to claim 6, wherein said frequency changing means changes the injection current for said semiconductor laser until said semiconductor laser causes mode hop.

9. A length measuring apparatus according to claim 4, further comprising fixing means for maintaining the frequency of the light beam emitted from said common light source constant, and a switch for the switching between said fixing means and frequency changing means.

10. A length measuring apparatus according to claim 3, wherein at least one of said first light projecting means and second light porjecting means further includes means for changing the frequency of the emitted light beam therefrom.

11. A length measuring apparatus according to claim 10, wherein said frequency changing means performs frequency modulation so that the frequency of the light beam emitted from at least one of said first and second light projecting means changes between a fourth frequency and a fifth frequency different from said first frequency of said first light projecting means and said second frequency of said second light projecting means by a predetermined frequency.

12. A length measuring apparatus according to claim 11, further comprising change detecting means for detecting a change of the phase of the light beam emitted from at least one of said first and second light projecting means subjected to frequency modulation by said frequency changing means, and wherein a relative distance up to the object to be measured is detected at least by results of detection by said phase change detecting means, said first phase detection means and said second phase detection means.

13. A length measuring apparatus according to claim 11, wherein said frequency changing means further includes means for changing a depth of said frequency modulation.

14. A length measuring apparatus according to claim 3, further comprising means for detecting a change in a wavelength of the light beam emitted from said second light projecting means, and means for controlling the wavelength of the light beam emitted from said second light projecting means according to a result of detection by said wavelength change detection means.

15. A length measuring apparatus according to claim 1, further comprising means for detecting the relative distance up to the object to be measured with high accuracy including fourth light projecting means for projecting a light beam having a fourth frequency onto the object to be measured, fourth phase detecting means for detecting a phase of a light beam incident upon a fourth predetermined position from said fourth light projecting means via the object to be measured, fifth light projecting means for projecting a light beam having a fifth frequency different from the fourth frequency onto the object to be measured, and fifth phase detection means for detecting a phase of a light beam incident upon a fifth predetermined position from said fifth light projecting means via the object to be measured, and wherein, after a relative distance up to the object to be measured has been detected according to results of detection by said first phase detection means and second phase detection means, the relative distance up to the object to be measured can be detected with high accuracy by results of detection by said fourth phase detection means and fifth phase detection means.

16. A length measuring apparatus according to claim 15, wherein said first through fifth light projecting means include a common light source.

17. A length measuring apparatus for measuring a length by making a light beam passing an optical path for measurement including an object to be measured and a light beam passing a reference optical path not including the object to be measured interfere with each other, said apparatus comprising:
   first light beam guiding means for guiding a light beam having a first frequency from a first light source and a light beam having a second frequency slightly different from said first frequency to said optical path for measurement and said reference optical path, respectively;
   second light beam guiding means for guiding a light beam having a third frequency different from said first frequency and a light beam having a fourth frequency slightly different from said third frequency to said optical path for measurement and said reference optical path;
   first photosensing means for sensing the light beams having said first and second frequencies guided by said first light beam guiding means and passing said respective optical paths;
   second photosensing meas for sensing the light beams having said third and fourth frequencies guided by said second light beam guiding means and passing said respective optical paths;
   first arithmetic means for calculating a relative amount of change of object to be measured according to a phase difference obtained from at least one of outputs from said first and second photosensing means; and
   second arithmetic means for calculating an absolute position of the object to be measured according to respective phase differences obtained from respective outputs from said first and second photosensing means;
   optical paths for measurement, along which the light beams having said first and third frequencies go toward the object to be measured, being identical,
   wherein said first arithmetic means calculates a relative amount of displacement of the object from the position of which the absolute position of the object is calculated by said second arithmetic means.

18. A length measuring apparatus for measuring an absolute distance and a relative displacement of an object to be measured comprising:
   light emitting means for emitting a displacement measurement light beam and distance measurement light beams each having a different frequency with each other and reference light beams for each of said light beams;
   first means for guiding said distance measurement light beams to the object and for calculating an absolute distance up to the object according to a light output when each of said distance measurement light beams interferes with the reference light beam for each of said distance measurement light beams, and
   second means for guiding said displacement measurement light beam to the object, and for calculating a relative displacement of the object according to a light output when said displacement measurement light beam interferes with the reference light beam for said displacement measurement light beam, said second means calculating a relative displacement of the object from the position of which said first means calculates the absolute distance up to the object.

wherein said optical path for the displacement measurement light beam and an optical path for at least one of said distance measurement light beams being identical.

19. A length measuring apparatus for measuring an absolute distance and a relative displacement of an object to be measured comprising:

light emitting means for emitting a displacement measurement light beam and distance measurement light beams each having a different frequency with each other and reference light beams for each of said light beams;

first means for guiding said distance measurement light beams to the object and for calculating an absolute distance up to the object according to a light output when each of said distance measurement light beams interferes with the reference light beam for each of said distance measurement light beams, and second means for guiding said displacement measurement light beam to the object, and for calculating a relative displacement of the object according to a light output when said displacement measurement light beam interferes with the reference light beam for said displacement measurement light beam, said second means calculating a relative displacement of the object from the position of which said first means calculates the absolute distance up to the object.

* * * * *

UNITED STATES PATENT AND TRADEMARK OFFICE
CERTIFICATE OF CORRECTION

PATENT NO. : 5,106,191
DATED : April 21, 1992
INVENTOR(S) : MASARU OHTSUKA

It is certified that error appears in the above-identified patent and that said Letters Patent is hereby corrected as shown below:

COLUMN 6

Line 1, "FIG. 2," should read --FIG. 1,--.

COLUMN 10

Line 53, "EXAMPLE 2" should read --EMBODIMENT 2--.

COLUMN 11

Line 32, "EXAMPLE 3" should read --EMBODIMENT 3--.

COLUMN 17

Line 6, "is" (second occurrence) should read --in--.
Line 34, "one" should read --once--.

COLUMN 18

Line 63, "variation" should read --variations--.

COLUMN 19

Line 30, "comprising" should read --comprising phase--.

UNITED STATES PATENT AND TRADEMARK OFFICE
CERTIFICATE OF CORRECTION

PATENT NO.   :   5,106,191
DATED        :   April 21, 1992
INVENTOR(S)  :   MASARU OHTSUKA It is certified that error appears in the above-identified patent and that said Letters Patent is hereby corrected as shown below:

<u>COLUMN 21</u>

Line 6, "object." should read --object,--.

Signed and Sealed this

Twelfth Day of October, 1993

Attest:

BRUCE LEHMAN

*Attesting Officer*     *Commissioner of Patents and Trademarks*